United States Patent [19]
Erbes et al.

[11] Patent Number: 5,249,232
[45] Date of Patent: Sep. 28, 1993

[54] DATA PROCESSING SYSTEM HAVING AN ENCRYPTION DEVICE

[75] Inventors: Norbert Erbes, Karlsruhe; Dietrich Rother, Tamm; Rainer Vogel, Walzbachtal; Christoph Prasse, Illingen, all of Fed. Rep. of Germany

[73] Assignee: Alcatel N.V., Amsterdam, Netherlands

[21] Appl. No.: 897,691

[22] Filed: Jun. 12, 1992

[30] Foreign Application Priority Data

Jun. 20, 1991 [DE] Fed. Rep. of Germany ....... 4120398

[51] Int. Cl.[5] .............................................. H04L 9/00
[52] U.S. Cl. ......................................... 380/49; 380/4; 380/9; 380/50
[58] Field of Search ...................... 380/4, 9, 49, 50, 52, 380/23, 25

[56] References Cited

U.S. PATENT DOCUMENTS

| | | | |
|---|---|---|---|
| 4,004,089 | 1/1977 | Richard et al. | 380/50 X |
| 4,120,030 | 10/1978 | Johnstone | 380/4 |
| 4,278,837 | 7/1981 | Best | 380/4 |
| 4,573,119 | 2/1986 | Westheimer et al. | 380/4 |
| 4,598,170 | 7/1986 | Piosenka et al. | 380/4 X |
| 4,698,617 | 10/1987 | Bauer | 380/4 X |
| 5,095,525 | 3/1992 | Almgren et al. | 380/4 X |

FOREIGN PATENT DOCUMENTS

| | | |
|---|---|---|
| 0171456 | 2/1986 | European Pat. Off. . |
| 0213118 | 3/1987 | European Pat. Off. . |
| 3601526 | 7/1987 | Fed. Rep. of Germany . |

*Primary Examiner*—Bernarr E. Gregory
*Attorney, Agent, or Firm*—Spencer, Frank & Schneider

[57] ABSTRACT

A data-processing system includes an address bus and a data bus operatively coupled to a central processing unit, main memories, and control circuits for peripheral equipment, information carried on the data bus being encrypted. An encryption and decryption device is operatively coupled between the data bus and the central processing unit, for encrypting and decrypting the information.

6 Claims, 1 Drawing Sheet

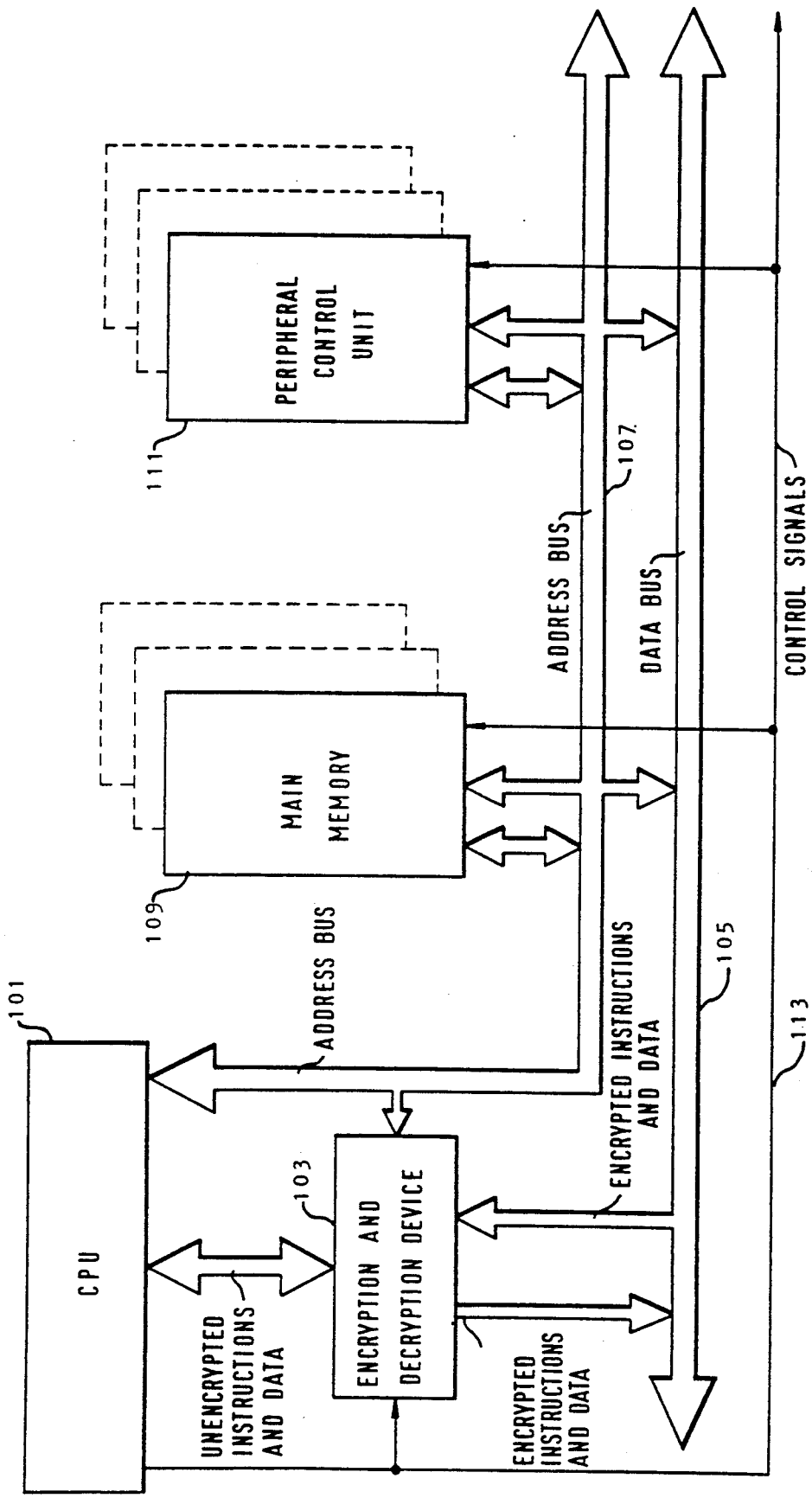

DATA PROCESSING SYSTEM HAVING AN ENCRYPTION DEVICE

BACKGROUND OF THE INVENTION

1. Field of the Invention

The present invention relates to a data-processing system having an address bus and a data bus to which are connected a central processing unit, main memories, and control circuits for peripheral equipment.

2. Background Information

Conventional data-processing systems, such as personal computers, are not protected from unauthorized access to the central processing unit (CPU). From terminals or other communications interfaces, for example, programs can be started in the CPU which can both change user programs in the main memory and destroy programs and data in peripheral bulk storages.

SUMMARY OF THE INVENTION

It is the object of the invention to protect existing data-processing systems, such as personal computers, from unauthorized access to the CPU.

This object is attained by providing a data-processing system wherein information carried on the data bus is encrypted, encryption and decryption of the information being performed by an encryption and decryption device operatively coupled between the data bus and the central processing unit. The data-processing system according to the invention has the advantage that protection from unauthorized access to the CPU is possible without intervention in existing software and without intervention in computer hardware. Use is made of the fact that the CPU is generally a plug-in unit. Instead of plugging the CPU directly into the socket, an encryption and decryption device is first inserted, and the CPU is then plugged onto this device.

BRIEF DESCRIPTION OF THE DRAWING

The invention will be described with reference to the drawing which depicts a block diagram of an embodiment of the invention.

Detailed Description of a Preferred Embodiment

A central processing unit (CPU) 101 communicates with an encryption and decryption device 103 via a plurality of lines. The encryption and decryption device is connected to a data bus 105. It receives information from the data bus 105 and delivers information to the data bus 105. Also provided is an address bus 107 which is connected to the encryption and decryption device 103 and the CPU. Address bus and data bus are connected to a main memory 109 and to peripheral control units 111. Also provided is a line 113 over which control signals for controlling the entire system are transferred.

In a first mode of the embodiment, exclusively encrypted information is carried both on the data bus 105 and on the address bus 107. Since the CPU 101 can process only unencrypted data, the data from the data bus 105 and the addresses from the address bus 107 must be decrypted before being processed in the CPU 101. This is done in the encryption and decryption device 103. The main memory 109 holds exclusively encrypted data. The peripherals, too, place exclusively encrypted data on the address 107 and data 105 buses.

In a second mode, only the information on the data bus 105 is encrypted. In this case, too, exclusively encrypted information is contained in the main memory 109. The peripheral control units 111, too, place only encrypted information on the data bus 105. The addresses on the address bus 107 are absolute addresses. Data moving from the data bus 105 toward the CPU 101 is decrypted by the device 103 and then fed to the CPU 101 for further processing. Results created by the CPU 101 are encrypted by the device 103 and then placed as encrypted information on the data bus 105. In a preferred embodiment of the invention, if the CPU 101 is a plug-in processor, the encryption and decryption device 103 is also designed as a plug-in device, which is then inserted into the socket for the CPU 101. The CPU 101 is subsequently plugged onto the encryption and decryption device 103.

We claim:

1. A data-processing system comprising:
an address bus and a data bus electrically coupled with a central processing unit, main memories, and control circuits for peripheral equipment, wherein exclusively encrypted information, including instructions and data, is carried on the data bus; and
encryption and decryption means, electrically coupled between the data bus and the central processing unit, for receiving unencrypted information, including unencrypted instructions and data, from the central processing unit, encrypting the information received from the central processing unit, and providing encrypted information, including encrypted instructions and data, to the data bus, and for receiving encrypted information, including encrypted instructions and data, from the data bus, decrypting the information received from the data bus, and providing unencrypted information, including unencrypted instructions and data, to the central processing unit.

2. A data-processing system as claimed in claim 1, wherein addresses carried on the address bus are exclusively encrypted addresses, and wherein said encryption and decryption means decrypts said encrypted addresses.

3. A data-processing system as claimed in claim 2, wherein said encryption and decryption means is plugged into a circuit board CPU socket of the data-processing system, and the central processing unit is plugged into said encryption and decryption means.

4. The system according to claim 2, wherein the control circuits for peripheral equipment receive and output the encrypted addresses from and to the address bus.

5. A data-processing system as claimed in claim 1, wherein said encryption and decryption means is plugged into a circuit board CPU socket of the data-processing system, and the central processing unit is plugged into said encryption and decryption means.

6. The system according to claim 1, wherein the control circuits for peripheral equipment receive and output the encrypted information, including data and instructions, from and to the data bus.

* * * * *